(12) United States Patent
An et al.

(10) Patent No.: US 6,595,105 B2
(45) Date of Patent: Jul. 22, 2003

(54) RECIPROCATING COMPRESSOR

(75) Inventors: Kwang Hyup An, Seoul (KR); Hwan Joo Myung, Kyonggi-do (KR); In Seop Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 09/817,129

(22) Filed: Mar. 27, 2001

(65) Prior Publication Data
US 2002/0043153 A1 Apr. 18, 2002

(30) Foreign Application Priority Data
Oct. 13, 2000 (KR) .......................................... 2000-60440

(51) Int. Cl.[7] .................................................. F01B 31/14
(52) U.S. Cl. .................. 92/60; 92/84; 92/140
(58) Field of Search ................................. 92/84, 60, 140

(56) References Cited
U.S. PATENT DOCUMENTS
5,988,994 A * 11/1999 Berchowitz .................. 417/415

* cited by examiner

Primary Examiner—Edward K. Look
Assistant Examiner—Michael Leslie
(74) Attorney, Agent, or Firm—Birch, Stewart, Kolasch & Birch, LLP

(57) ABSTRACT

Reciprocating compressor including a connecting rod for converting a rotating movement of a crank shaft into a linear reciprocating movement, a piston for making a linear reciprocating movement inside of a cylinder block by the connecting rod, and resonating means for resonating the piston, wherein the resonating means is a supplementary piston fitted to the piston additionally and a resonator fitted between the supplementary piston and the piston, or a resonator in a space between a sleeve side part and a piston side part of a divided connecting rod, thereby preventing an over pressure loss of the refrigerant and enhancing a performance by increasing refrigerant flow rate.

14 Claims, 9 Drawing Sheets

RECIPROCATING COMPRESSOR

BACKGROUND OF THE INVENTION

Field of the Invention

The present invention relates to a compressor, and more particularly, to a reciprocating compressor, in which suction and compression are made by reciprocation of a piston in a cylinder, and which has improved refrigerant suction and discharge performances.

BACKGROUND OF THE RELATED ART

The compressor in a refrigerator or an air conditioner draws a low temperature and low pressure operating fluid passed through an evaporator, compresses into a high temperature and high pressure fluid in a cylinder and discharges the operating fluid in a high temperature and a high pressure state. A related art reciprocating compressor in a refrigerator and the like will be explained briefly with reference to the attached drawings.

Figure 1:
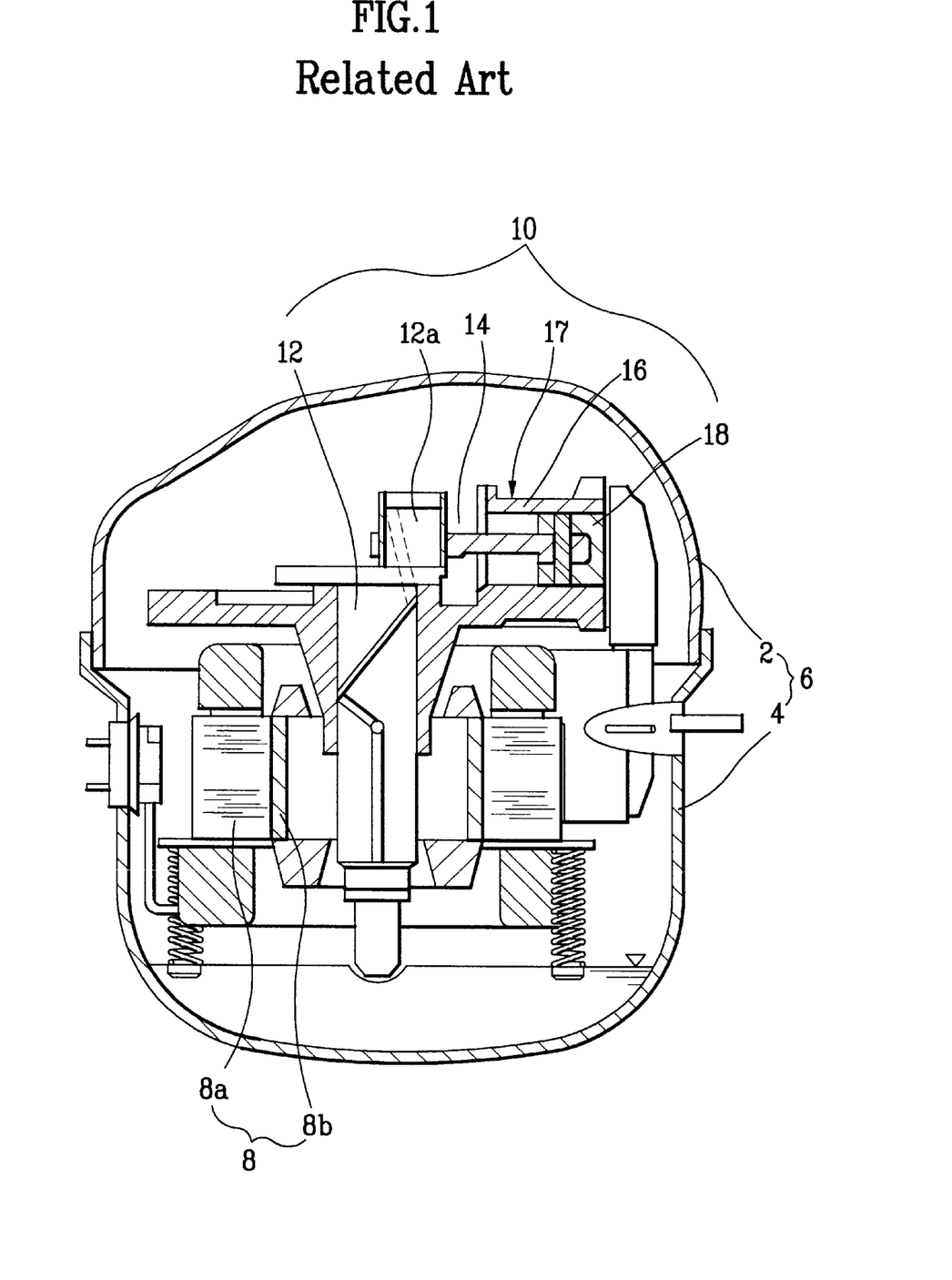
FIG. 1 illustrates a section of a related art reciprocating compressor, schematically.
Figure 2:
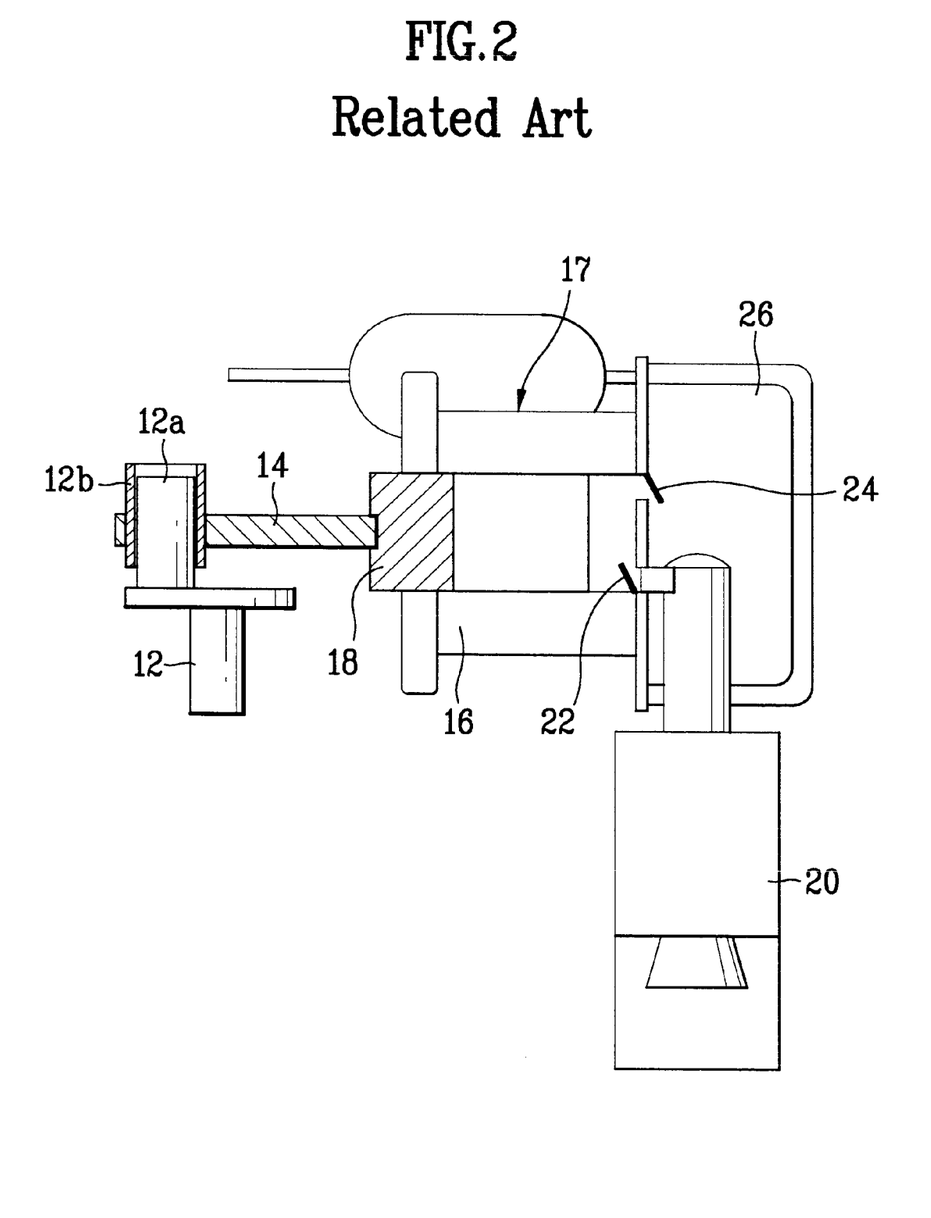
FIG. 2 illustrates a suction system and a discharge system of a related art reciprocating compressor, schematically.

Referring to FIG. 1, the related art reciprocating compressor is provided with a motor part 8 for receiving a current to generate a rotating force, and a compressor part 10 for compressing the refrigerant by the rotating force of the motor part, both of which are enclosed in a case 6 having an upper shell 2 and a lower shell 4. The motor part 8 has a stator 8a for receiving the current to generate an electromagnetic force, and a rotor 8b for generating a rotating force by the electromagnetic force. The compressor part 10 has a crank shaft 12 for rotating with the rotor 8b, a connecting rod 14 for converting a rotating movement of the crank shaft into a linear reciprocating movement, and a piston 18 for compressing refrigerant in a cylinder block 16 by means of the connecting rod. The connecting rod 14 has one end pin coupled to an eccentric piece 12a on top of the crank shaft 12, and the other end pin coupled to the piston 18, for converting the rotating movement of the crank shaft 12 into a linear reciprocating movement. The foregoing compressor operation may be summarized as follows. As the piston 18 makes a linear reciprocating movement in the cylinder block 16 at reception of a rotating movement of the crank shaft 12, the piston 18 converts a low temperature, low pressure refrigerant from the evaporator into a high temperature, high pressure refrigerant through a process of refrigerant suction, compression, and discharge, and forwards to a condenser (not shown). The operation of piston in suction, compression and discharge will be explained, with reference to FIG. 2. FIG. 2 illustrates a suction system and a discharge system of a related art reciprocating compressor, schematically.

Figure 3:
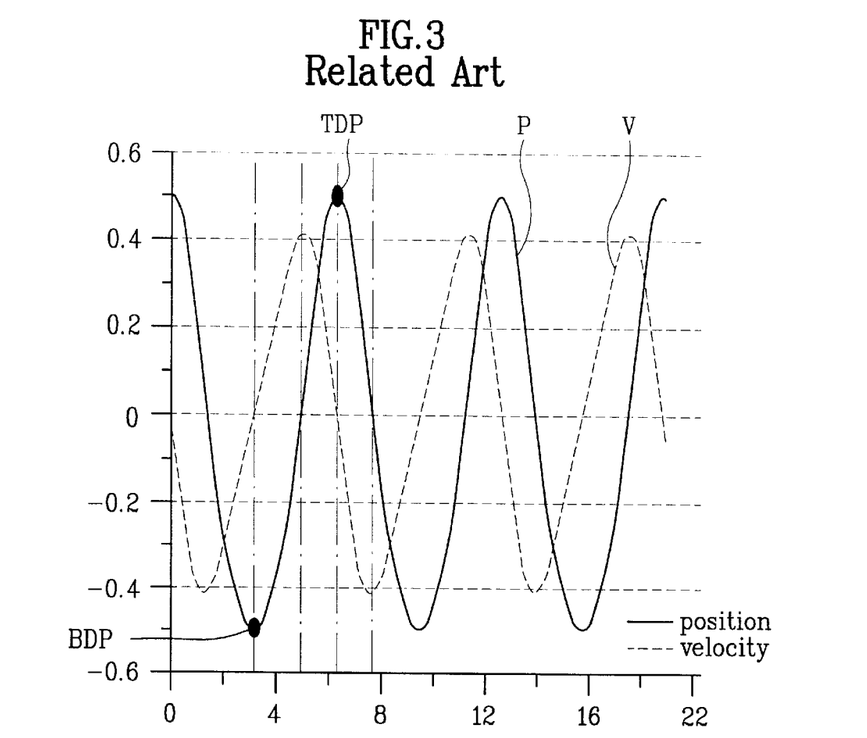
FIG. 3 illustrates a graph showing position vs. velocity of a related art piston.
Figure 4:
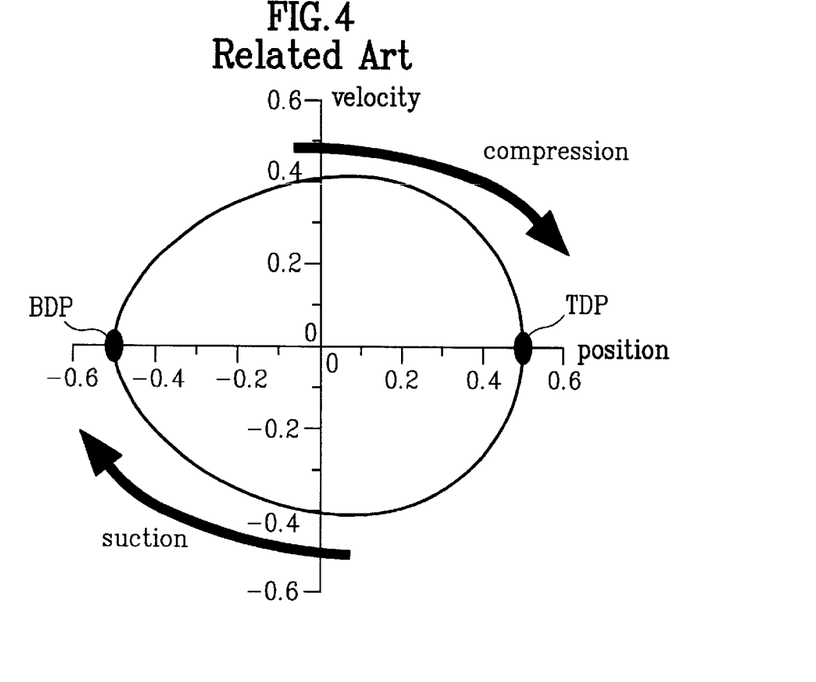
FIG. 4 illustrates a graph showing position vs. velocity of a related art piston.

Referring to FIG. 2, the crank shaft 12 receives the rotating force from the motor part (see FIG. 1) and rotates the eccentric piece 12a, which rotating force is transmitted to the connecting rod 14 via a sleeve 12b, and the piston 18 coupled to the connecting rod 14 makes a linear reciprocating movement as movement of the piston is restricted in the cylinder block 16. The piston moves from a top dead center to a bottom dead center until a pressure inside of the cylinder 17 is lower than a pressure in a suction muffler 20 when a suction valve 22 is opened to allow the refrigerant to be introduced into the cylinder 17 until the pressure in the cylinder 17 becomes equal to the pressure in the muffler 20. When the piston 18 moves from the bottom dead center to the top dead center, the pressure in the cylinder 17 keeps to build-up to compress the refrigerant until the pressure in the cylinder 17 is higher than an elastic force of a discharge spring (not shown) supporting a discharge valve 24, when the discharge valve 24 is opened, through which a high pressure refrigerant is discharged from the cylinder to a discharge plenum 26. FIG. 3 illustrates a graph showing a result of mathematical modelling of position vs. velocity of the piston 18 fixed by the sleeve 12b and the connecting rod 14, and FIG. 4 illustrates a graph showing position vs. velocity of the piston 18.

Referring to FIG. 3, a position 'P' of the piston 18 moves along a sinusoidal curve as the piston 18 reciprocates within the cylinder between a top dead center and a bottom dead center, and the velocity of the piston 18 also shows a sinusoidal curve having 90° phase difference with the piston position 'P' as time goes by. FIG. 4 is a graph which facilitate an easy understanding of a relation between position and velocity of the piston, wherefrom it can be known that the piston has a maximum velocity when the piston passes a point M1 and M2 slightly closer to the top dead center from a center of the top dead center and the bottom dead center.

Figure 5:
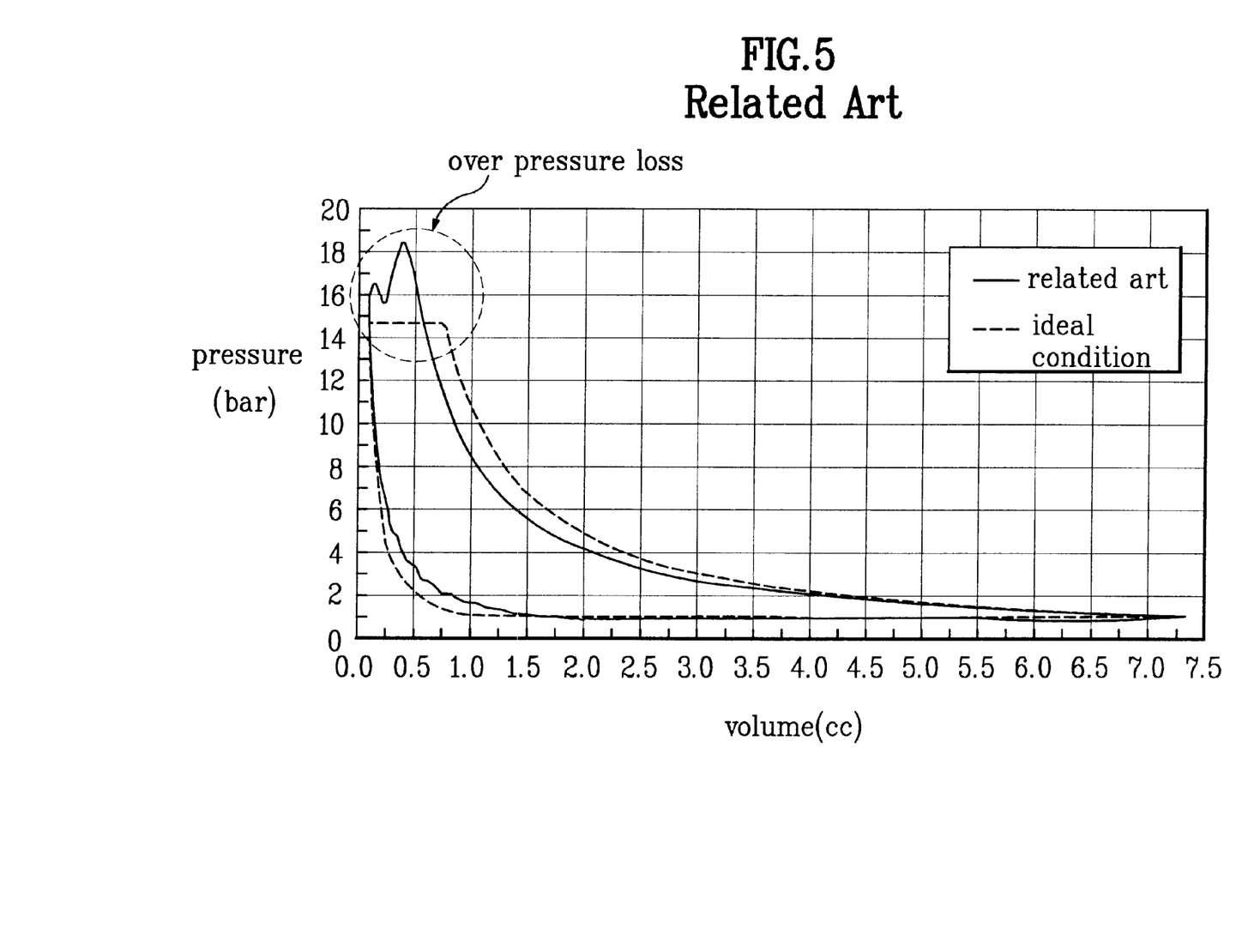
FIG. 5 illustrates a graph showing pressure vs. volume of a related art piston in a cylinder.

FIG. 5 illustrates a graph showing pressure vs. displacement (volume) of the piston during suction and compression of the piston, in comparison to an ideal condition. As can be known from the drawing, the discharge of refrigerant at a pressure higher than an ideal pressure causes waste of the pressure. As shown in FIGS. 4 and 5, the non-uniform velocity and the excessive velocity and pressure in the vicinity of the top dead center occurred in compression of the piston in the related art compressor causes pressure loss. Contrary to this, the reduced amount of drawn refrigerant in suction coming from a weak suction force caused by a relatively small velocity gradient right before the bottom dead center deteriorates a smooth compression effect and performance of the compressor.

SUMMARY OF THE INVENTION

Accordingly, the present invention is directed to a reciprocating compressor that substantially obviates one or more of the problems due to limitations and disadvantages of the related art.

An object of the present invention is to provide a reciprocating compressor which can prevent an over pressure loss during refrigerant discharge.

Another object of the present invention is to provide a reciprocating compressor which can improve a compression performance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the reciprocating compressor includes a connecting rod for converting a rotating movement of a crank shaft into a linear reciprocating movement, a piston for compressing a refrigerant inside of a cylinder block by the connecting rod, and, resonating means having a vibration frequency the same with the piston for applying vibration to a piston movement to give a resonance.

The resonating means includes a supplementary piston for drawing, compressing and discharging the refrigerant in a cylinder in contact with the refrigerant, and a resonator for making the supplementary piston to resonate with the piston.

The resonator is disposed between the piston and the supplementary piston.

Preferably, the resonator is a plate spring, a coil spring, or a pneumatic spring employing an air pressure.

The piston and the supplementary piston include coupling means for preventing break away of the piston and the supplementary piston, and the coupling means includes a coupling tube fitted to the piston, and a coupling rod fitted to the supplementary piston.

The reciprocating compressor further includes a connecting tube for surrounding both the sleeve side part and the piston side part.

The connecting tube and the sleeve side part and the piston side part of the connecting rod include stoppers at both ends, and fore ends thereof, respectively.

The connecting tube has a projection on an inside thereof for limiting a minimum displacement when the sleeve side part and the piston side part come closer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 6:
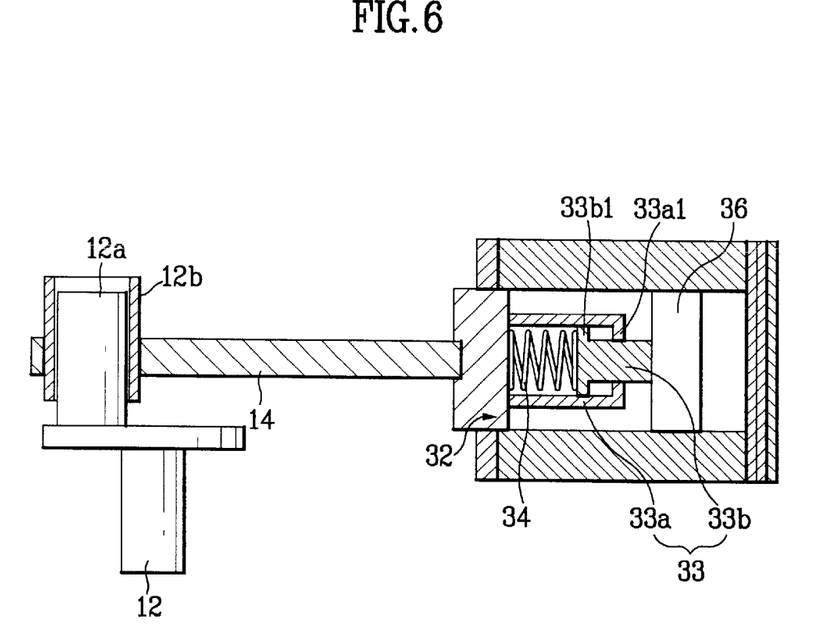
FIG. 6 illustrates a section of a compressor part in a reciprocating compressor in accordance with a preferred embodiment of the present invention.
Figure 7:
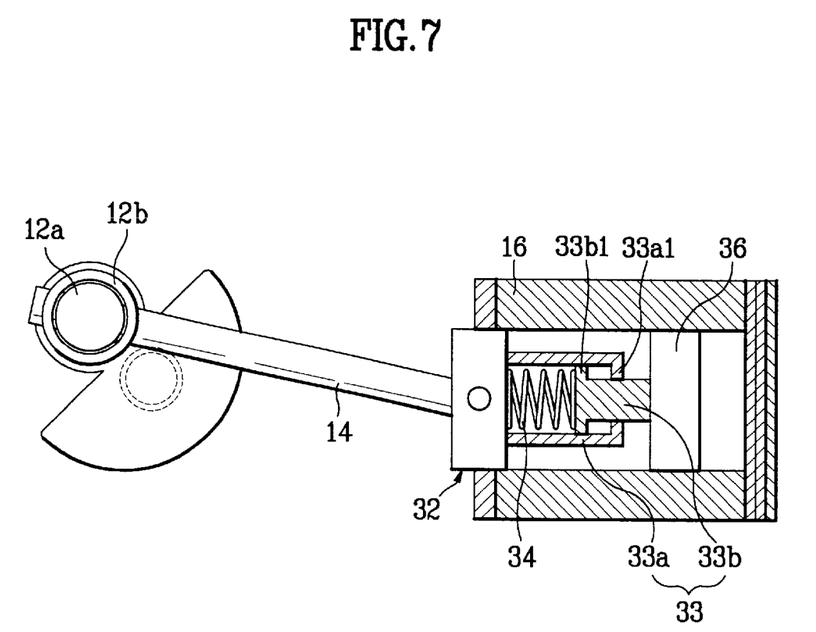
FIG. 7 illustrates a plane-view including a partial section of the compressor part shown in FIG. 6.

Reference will now be made in detail to the preferred embodiments of the present invention, example of which are illustrated in the accompanying drawings. FIG. 6 illustrates a section of a compressor part in a reciprocating compressor in accordance with a preferred embodiment of the present invention, and FIG. 7 illustrates a plane-view including a partial section of the compressor part shown in FIG. 6.

Referring to FIG. 6, the compressor part in a reciprocating compressor in accordance with a preferred embodiment of the present invention includes a connecting rod for converting rotating movement of a crank shaft into a linear reciprocating movement, a piston for making linear reciprocating movement within a cylinder block by using the connecting rod, and a resonating means for making the piston to resonate. In detail, there is an eccentric piece 12a on a top of the crank shaft 12 which receives a rotating force from a rotor (see FIG. 1), and a sleeve 12b to surround the eccentric piece 12a for serving as a bearing. The sleeve 12b is coupled with the connecting rod 14 for transmission of the rotating force from the crank shaft 12 to the piston 32. There is the piston 32 coupled at a fore end of the connecting rod 14 for direct reception of the rotating force from the crank shaft 12, and the resonator 34 and the supplementary piston 36 are fitted to the piston 32.

A system of the compressor part will be explained with reference to FIGS. 6 and 7.

The piston 32 of the present invention includes a supplementary piston 36, additionally. The supplementary piston 36 is apart actually in contact with the refrigerant for compressing and drawing the refrigerant, which is connected to the piston 32 by means of coupling means 33. The coupling means 33 has a coupling tube 33a fixed to the piston 32, and a coupling rod 33b fixed to the supplementary piston 36. The coupling tube 33a has one side fixed to the piston 32 and the other side opened the coupling rod 33b on the supplementary piston is inserted therethrough. The coupling rod 33b of a circular section has one side fixed to the supplementary piston 36 and the other side inserted in the coupling tube 33a. There is a coil spring 34, a resonator, inside of the coupling tube 33a, to which the coupling rod 33b is in contact. There is a stopper 33a1 and 33b1 on a fore end of each of the coupling tube 33a and the coupling rod 33b for limiting a maximum displacement between the piston 32 and the supplementary piston 36. A minimum displacement between the piston 32 and the supplementary piston 36 is reached when the coupling rod 33b is inserted in the coupling tube 33a completely, i.e., when the fore end of the coupling tube 33a is brought into contact with the supplementary piston 36 such that the coupling tube 33a can not make any more advance.

The operation of the piston 32, the coupling means 33 and the resonating means in the compressor part will be explained.

A natural frequency of the coil spring 34 and the supplementary piston 36 is the same with a reciprocation frequency of the piston 32. A natural frequency of the supplementary piston 36 is the same with a number of rotation of the rotor such that the supplementary piston 36 resonates with the piston 32 at a reciprocating frequency the same with the piston.

Figure 8:
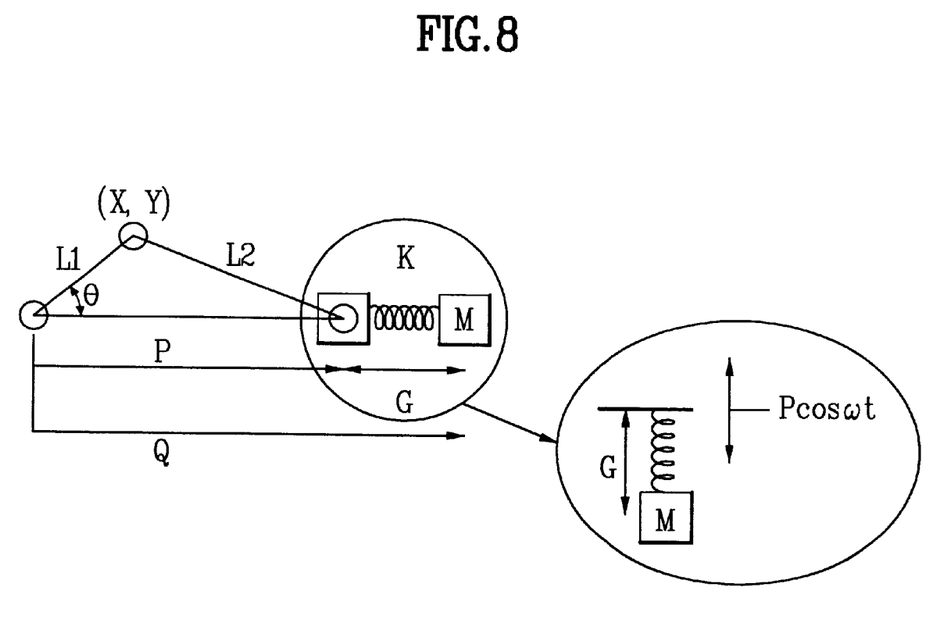
FIG. 8 illustrates a model of a piston system in the compressor part, schematically.
Figure 9:
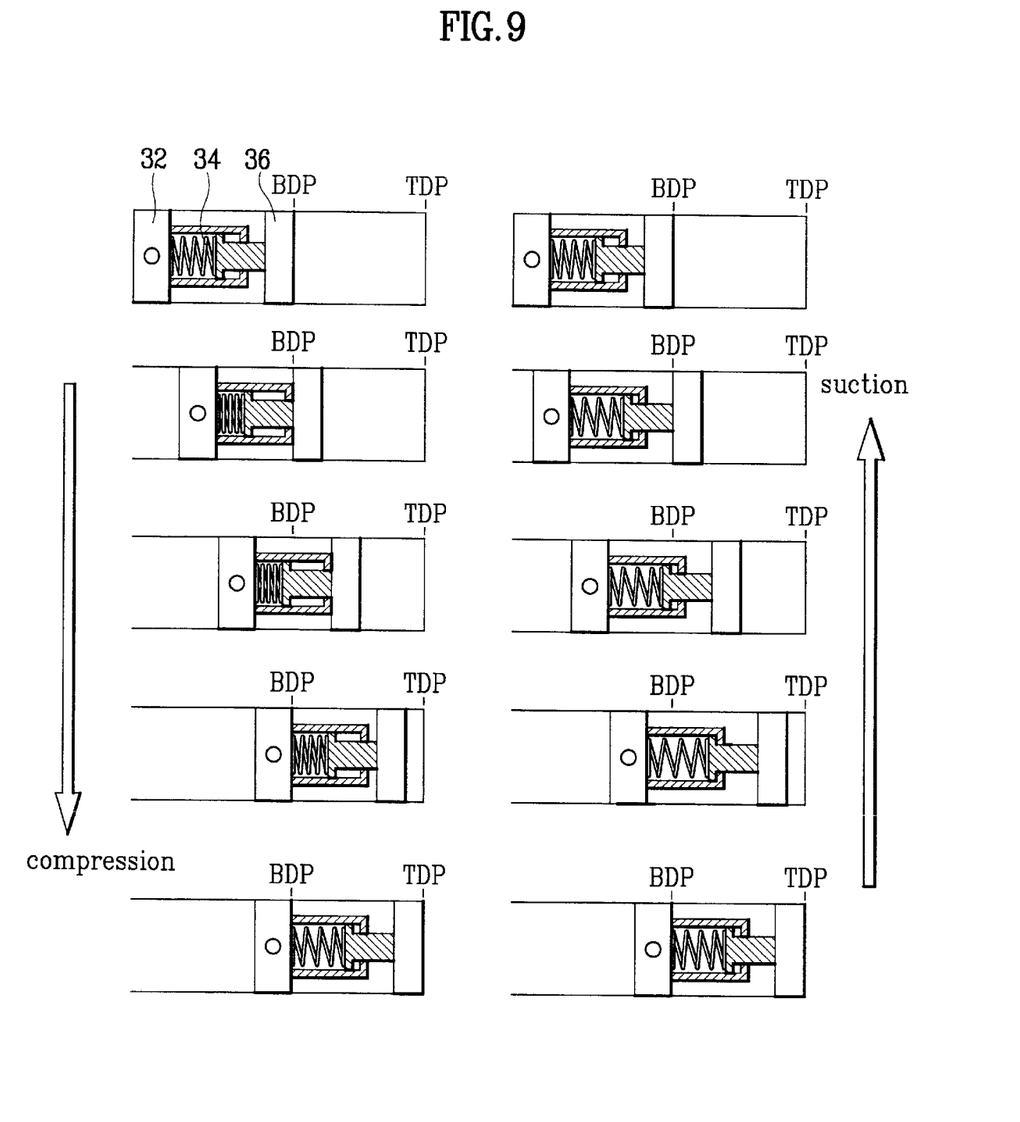
FIG. 9 illustrates sections of a piston system showing a sequence of operation during suction and compression.

FIG. 8 illustrates a model of a piston system in the compressor part schematically, referring to which the piston system can be expressed as the following equation.

$$X = L1 \cos \theta \quad (1),$$

$$Y = L1 \sin \theta \quad (2),$$

$$X' = -\omega L1 \sin \theta \quad (3),$$

$$Y'=\omega L1 \cos\theta \quad (4),$$

$$P=X+\sqrt{(L2^{2-Y^2}} \quad (5),$$

$$dP/dT=YY'/(X-P)+X' \quad (6),$$

$$G=\gamma|P|\cos(\omega t-\theta) \quad (7),$$

$$Q=P+G=P=X+\sqrt{(L2^{2-Y^2}}+\gamma|P|\cos(\omega t-\theta) \quad (8),$$

$$dQ/dT=YY'/(X-P)+X'-\gamma|P|\cos(\omega t-\theta) \quad (9),$$

where, $\gamma$ and $\theta$=function of $\omega_n(=\sqrt{(K/M)})$, K: modulus of elasticity of the resonator, and M: mass of the supplementary piston. As shown in the drawing, the position 'P' of the piston 32 moves along a sinusoidal curve the same as the piston in the related art compressor, and the supplementary piston 36 moved by the piston 32 also moves along a sinusoidal curve the same as the piston 32. When the natural frequency of the spring 34 and the supplementary piston 36 is set to be the same with the reciprocating frequency of the piston 32, a resonating behavior Q of the supplementary piston 36 is expressed as the equation (8), where '$\gamma$' is a displacement damping ratio caused by compression work and a suction work, and a phase difference is expressed as a function of the natural frequency and the damping ratio. If an extent of damping caused by the compression and suction is taken into account, the supplementary piston 36 displaces according to the equation (8), and moves at a velocity according to the equation 9. Operation of the piston 32, the supplementary piston 36, and the resonator, i.e., the coil spring 34 are shown in FIG. 9.

Referring to FIG. 9, in compression, the spring 34 is compressed by the speed of the piston at an initial stage, and though a displacement of the supplementary piston 36 is smaller than the displacement of the piston 32 at the initial stage, the spring 34 expands the greater as the compression process goes to a later half such that the displacement of the supplementary piston 36 is greater than the displacement of the piston 32, resulting that the speed of the supplementary piston 36 is almost constant over the entire compression process without any great variation with respect to time, to make a constant speed compression. In suction, though the speed of the supplementary piston 36 is not great since the supplementary piston 36 can not catch up the speed of the piston 32, a suction speed becomes the faster because of compression of the spring as the suction process goes to a later half when the piston 32 approaches to a bottom dead center, resulting that the speed of the supplementary piston 36 catches up the speed of the piston 32 right before the bottom dead center, that increases the speed in comparison to the related art, to increase a flow rate of drawing refrigerant.

Thus, by fitting the spring 34 and the supplementary piston 36 to the piston 32, the over pressure loss can be reduced as the refrigerant is compressed at a more uniform speed, and a performance of the compressor is enhanced since the speed is increased in the vicinity of the bottom dead center during suction, which allows to draw more amount of refrigerant.

Figure 10:
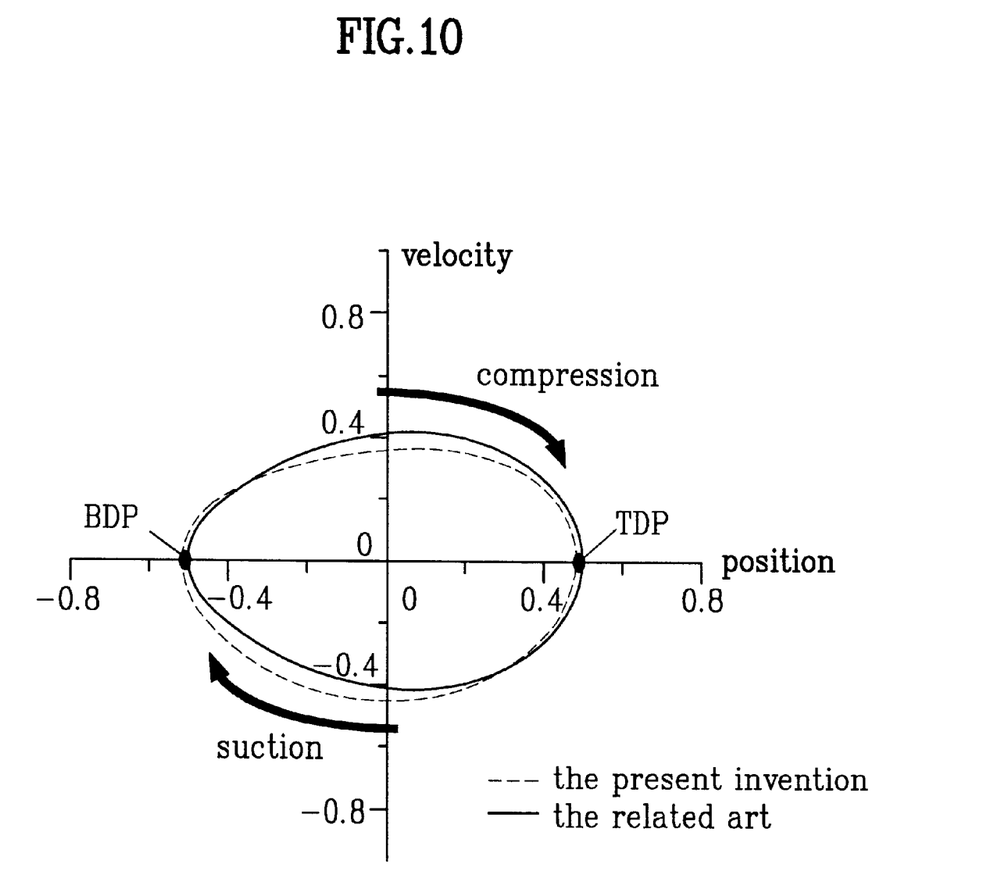
FIG. 10 illustrates a graph showing comparison of position vs. velocity of a supplementary piston of the present invention and a related art piston.

FIG. 10 illustrates a graph showing comparison of position vs. velocity of a supplementary piston of the present invention and a related art piston, wherein the dashed line represents a position vs. velocity graph of the related art piston 18 and the solid line represents a position vs. velocity graph of the supplementary piston 36 of the present invention. Compression and suction of the related art piston and the supplementary piston of the present invention are compared as follows.

Though the sharp increase of speed of the piston as the piston approaches to the top dead center in the related art compression causes over pressure to the refrigerant, the uniform speed distribution of the supplementary piston in the present invention compression permits to prevent unnecessary energy loss. The sharp speed drop of the piston as the piston approaches to the bottom dead center in the related art suction causes to fail to secure much amount of refrigerant, the uniform speed distribution of the supplementary piston in the present invention suction permits to secure much amount of refrigerant, thereby permitting to enhance a compressor efficiency.

Figure 11:
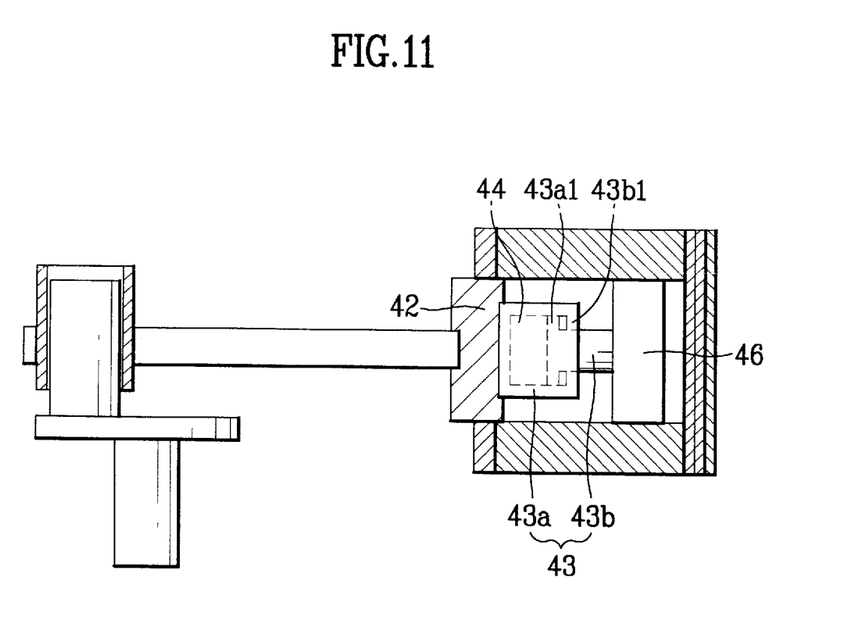
FIG. 11 illustrates a section showing a compressor part having a resonator of a pneumatic type applied thereto in accordance with another preferred embodiment of the present invention; and, FIG. 12 illustrates a section showing a compressor part having a resonator provided to a connecting rod in a reciprocating compressor in accordance with another preferred embodiment of the present invention.

FIG. 11 illustrates a section showing a compressor part having a resonator of a pneumatic type applied thereto in accordance with another preferred embodiment of the present invention.

Referring to FIG. 11, a piston system includes a piston 42 and a supplementary piston 46 of a pneumatic type 44, which acts the same as the spring 34 in the foregoing embodiment, to make a speed gradient uniform in the compression and suction processes, to increase refrigerant flow rates. The piston 42 and the supplementary piston 46 are coupled by coupling means 43 having a coupling tube 43a, a coupling rod 43b and stoppers 43a1 and 43b1, similar to the embodiment in FIG. 6.

Figure 12:
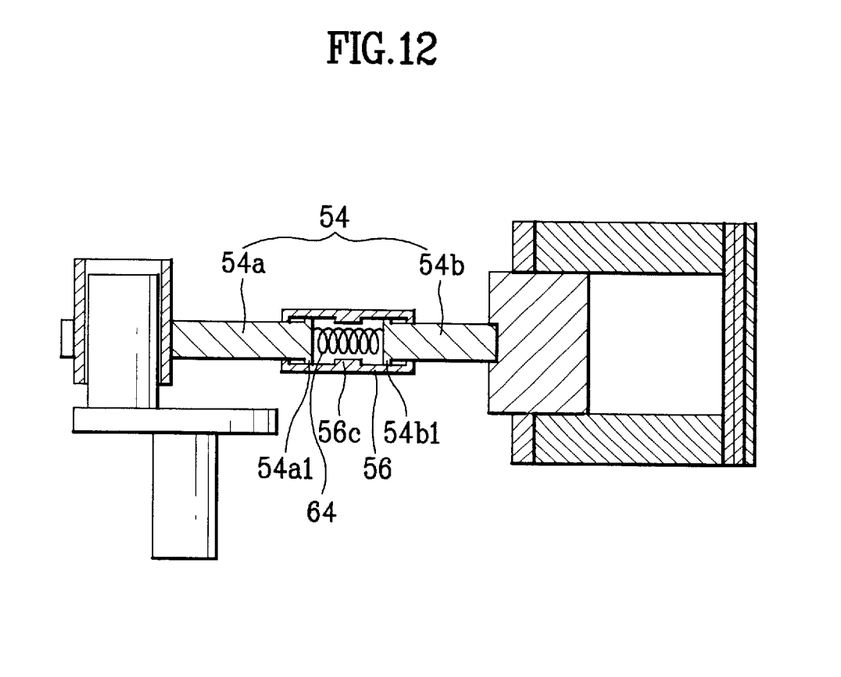

FIG. 12 illustrates a section showing a compressor part having a resonator provided to a connecting rod in a reciprocating compressor in accordance with another preferred embodiment of the present invention.

Referring to FIG. 12, it can be known that the connection rod 54 of this embodiment is divided into two members. The connecting rod 54 includes a sleeve side part 54a coupled to the sleeve 12b, and a piston side part 54b coupled to the piston 60, and a coil spring 64 inserted in a space between the sleeve side part 54a and the piston side part 54b as a resonator. There is a connection tube 56 surrounding both members 54a and 54b for limiting maximum and minimum displacements between the two members 54a and 54b of the connecting rod 54. The connecting tube 56 has a circular section with an inside diameter greater than an outside diameter of the connecting rod 54 for inserting the connecting rod 54 therein. Each of the two members 54a and 54b of the connecting rod 54 has a stopper 54a1 or 54b1 for limiting the maximum displacement of the member 54a or 54b. The connecting tube 56 has a projection 56c on an inside of middle of the connecting tube 56 for stopping the sleeve side part 54a and the piston side part 54b of the connecting rod 54 when both members are compressed for limiting a minimum displacement. The connecting tube 56, not only limits the maximum and minimum displacements, but also makes the two members maintained on the same axis.

In all of the embodiments, other than the coil spring, an elastic body, such as plate spring and the like, may be used. It is also desirable that the pneumatic spring shown in FIG. 12 is used. When the plate spring is employed, a plate spring of bellows type is preferable. The embodiment shown in FIG. 12 has a greater refrigerant flow rate than the related art because, alike the foregoing embodiment, a uniform speed can be obtained in compression and suction and a higher piston speed can be obtained in the vicinity of bottom dead center in suction.

It will be apparent to those skilled in the art that various modifications and variations can be made in the reciprocating compressor of the present invention without departing from the spirit or scope of the invention. Thus, it is intended that the present invention cover the modifications and variations of this invention provided they come within the scope of the appended claims and their equivalents.

What is claimed is:

1. A reciprocating compressor comprising:

a connecting rod for converting a rotating movement of a crank shaft into a linear reciprocating movement;

a piston for making a linear reciprocating movement inside of a cylinder block by the connecting rod; and resonating means fitted to the piston for resonating the piston.

2. A reciprocating compressor as claimed in claim 1, wherein said resonating means includes a supplementary piston for compressing and drawing a refrigerant in a cylinder in contact with the refrigerant, and a resonator disposed between the piston and the supplementary piston, said resonator having a vibration frequency the same as a frequency of the piston's reciprocation.

3. A reciprocating compressor as claimed in claim 2, wherein the resonator is a plate spring, a coil spring, or a pneumatic spring employing an air pressure.

4. A reciprocating compressor as claimed in claim 2, wherein the piston and the supplementary piston include coupling means for preventing break away of the piston and the supplementary piston.

5. A reciprocating compressor as claimed in claim 4, wherein said coupling means includes a coupling tube fitted to the piston, and a coupling rod fitted to the supplementary piston.

6. A reciprocating compressor as claimed in claim 5, wherein the coupling tube and the coupling rod have stoppers at fore ends thereof respectively for preventing breakaway of the coupling tube and the coupling rod.

7. A reciprocating compressor as claimed in claim 1, wherein said resonating means includes a resonator having a vibration frequency the same with the frequency of the piston's reciprocation.

8. A reciprocating compressor comprising:

a connecting rod for converting a rotating movement of a crank shaft into a linear reciprocating movement, the connecting rod being divided into a sleeve side part and a piston side part;

a piston for making a linear reciprocating movement inside of a cylinder block by the connecting rod; and resonating means connecting the sleeve side part with the piston side part for resonating the piston.

9. A reciprocating compressor as claimed in claim 8, wherein said resonating means includes a resonator having a vibration frequency the same with the frequency of the piston's reciprocation.

10. A reciprocating compressor as claimed in claim 9, wherein the resonator is a plate spring, a coil spring, or a pneumatic spring employing an air pressure.

11. A reciprocating compressor as claimed in claim 8, further comprising a connecting tube for surrounding both the sleeve side part and the piston side part.

12. A reciprocating compressor as claimed in claim 11, wherein the connecting tube and the sleeve side part and the piston side part of the connecting rod include stoppers at both ends, and fore ends thereof respectively.

13. A reciprocating compressor as claimed in claim 12, wherein the connecting tube has a projection on an inside thereof for limiting a minimum displacement when the sleeve side part and the piston side part come closer.

14. A reciprocating compressor comprising:

a connecting rod for converting a rotating movement of a crank shaft into a linear reciprocating movement;

a piston for making a linear reciprocating movement inside of a cylinder block by the connecting rod; and resonating means for resonating the piston, wherein said resonating means includes a supplementary piston for compressing and drawing a refrigerant in a cylinder in contact with the refrigerant, and a resonator disposed between the piston and the supplementary piston, said resonator having a vibration frequency the same as a frequency of the piston's reciprocation.

* * * * *